Patented Mar. 8, 1949

2,463,872

UNITED STATES PATENT OFFICE 2,463,872

PRODUCTION OF SYNTHETIC LUBRICATING OIL

Raymond L. Heinrich, Baytown, Tex., assignor, by mesne assignments, to Standard Oil Development Company, Elizabeth, N. J., a corporation of Delaware No Drawing. Application March 7, 1947, Serial No. 733,183

3 Claims. (Cl. 260—683.4)

The present invention is directed to a method for polymerizing alpha olefins. More particularly, the invention is directed to a method for producing polymers having lubricating oil qualities.

It has been known to polymerize alpha olefins in the presence of Friedel-Crafts type catalyst to obtain polymers having lubricating oil characteristics. It has also been known to employ diluents for the reaction so that the heat of reaction may be removed by volatilization of the diluent. While the lubricating oil polymers produced by these methods have high viscosity indexes, gravities and other characteristics which make them suitable for use in lubricating internal combustion and other motors, the polymers have a residual unsaturation amounting to at least one carbon-carbon double bond per molecule of polymer. This reactive group in the molecule causes the oil to be susceptible to oxidation, sludging, depolymerization, and other undesirable reactions under conditions of use which makes them less desirable, in some respects, in lubricating services than the lubricating oil fractions produced from crude petroleums. If the oil were purely paraffinic in nature, that is if the double bond were not present in the molecule, its characteristics with regard to lubrication would be considerably enhanced. It has been proposed by prior art workers to eliminate the double bond in the lubricating oil polymers by saturating the molecule by hydrogenation thereof. This step, however, is expensive and adds greatly to the cost of the oil by virtue of the expensive nature of high pressure hydrogenation equipment, the nature of the catalyst, and a source of hydrogen being required.

It is, therefore, the main object of the present invention to provide a method for saturating high molecular weight alpha olefin polymers.

Another object of the present invention is to provide a lubricating oil of substantially saturated nature and having improved lubrication characteristics.

Still another object of the present invention is to provide a method for polymerizing alpha olefins to high molecular weight polymers suitable as lubricating oils of substantially small residual saturation.

The objects of the present invention may be achieved by polymerizing an alpha olefin under suitable conditions of temperature and pressure and in the presence of a polymerization catalyst to form a polymer in the lubricating oil boiling range and then converting the polymer into a substantially saturated molecule by alkylating the residual unsaturation of the polymer with an isoparaffin in the presence of an alkylation catalyst.

Briefly, the present invention may be described as embodying the steps of polymerizing an alpha olefin under substantially atmospheric temperature conditions and for a time sufficient to produce a polymer in the lubricating oil boiling range employing a suitable polymerization catalyst, terminating the polymerization reaction, and then alkylating the polymer with an isoparaffin employing an alkylation catalyst for the reaction under temperature conditions substantially the same as those employed in the polymerization reaction although higher or lower temperatures may be employed in the last stage of the process.

The invention may also be described as including the polymerization-alkylation of alpha olefins in the presence of an isoparaffin under substantially atmospheric temperature conditions such that a substantially saturated product is obtained.

In accordance with the present invention, a new method has been discovered for saturating the double bond in synthetic lubricating oil prepared by polymerization of alpha olefins. Thus, it is possible to react an olefin polymer produced by polymerizing an alpha olefin under substantially atmospheric temperature conditions with an isoparaffin or with a similar other reactive hydrocarbon such as a naphthene, which may be exemplified by methyl cyclopentane, in the presence of an alkylating catalyst which may be sulfuric acid, hydrogen fluoride, or fluosulfonic acid, or the Friedel-Crafts type catalyst promoted with a hydrogen halide. This latter type of catalyst is especially attractive since the Friedel-Crafts type catalyst without the promoter is a polymerization catalyst, and, thus, it is possible to conduct the process of the present invention such that the alpha olefins are polymerized in the presence of a Friedel-Crafts catalyst, such as aluminum chloride, and the polymerization catalyst activity terminated and converted to an alkylation catalyst by providing a promoter for the reaction and an isoparaffin or naphthene for the polymer to react with.

Thus, in accordance with the present invention, the polymerization and alkylation may be conducted as a series of steps or the two reactions may be allowed to proceed substantially simultaneously with the resultant product being a substantially saturated lubricating oil. It is preferred, however, to allow the polymerization reaction to proceed to a point where a polymer of the proper boiling range and viscosity characteristics is produced, terminate the reaction by withdrawing or killing the catalyst or preferably converting the catalyst into an alkylation catalyst by providing a promoter such as hydrogen halide for the reaction and then conduct the alkylation reaction.

The polymerization reaction may be controlled or terminated by addition of the alkylated material such as an isoparaffin or naphthene at an intermediate stage of the polymerization reaction, in this manner terminating the polymerization reaction at any desired molecular weight or viscosity of the product. The other alkylation catalysts, such as those of the type mentioned before, may be employed in much the same manner; these other catalysts will not interfere with the Friedel-Crafts type catalyst employed in the polymerization reaction in view of the small amount of polymerization catalyst required for the polymerization reaction. As mentioned before, it may be more desirable to carry out the alkylation step as a separate reaction with separation of the Friedel-Crafts type catalyst from the products if a catalyst other than the Friedel-Crafts type catalyst promoted with hydrogen halide is employed as the alkylation catalyst.

The alpha olefins employed as a feed stock for the present invention are the olefins illustrated by butene-1, pentene-1, heptene, hexene-1, and the higher alpha olefins of the homologous members of this series.

The isoparaffins employed in the alkylation reaction may be isobutane, isopentane, isohexane, isoheptane, and the higher boiling isoparaffins. It is possible to employ the isoparaffin or naphthene with which the polymer is alkylated as a diluent for the reaction in the polymerization stage. It has been found that little or no alkylation takes place during the polymerization step in the presence of Friedel-Crafts type catalyst unless a suitable promoter, such as hydrogen halide, is present. In the instances where hydrogen halide is present, polymerization and alkylation take place substantially simultaneously. This is less desirable than the series operation since a product having lower viscosity index is produced when the reactions occur simultaneously than when they occur in series. However, the unsaturation of the carbon-carbon bond in the molecule is reduced substantially.

In addition to the saturation of the alpha olefinic polymers to substantially saturated paraffinic compounds another benefit is realized by proceeding in accordance with the present invention. Thus, a favorable increase in lubricating oil yield results from the addition of the isoparaffin or other alkylating agent to the lubricant molecule.

The invention will be further illustrated by the following runs in which pentene-1 was polymerized in isopentane as a diluent employing aluminum chloride as the catalyst.

The considerable heat of the polymerization reaction was removed by volatilization of a portion of the isopentane employed as the diluent. The isopentane which was vaporized was condensed and returned to the reaction zone. The isopentane subsequently served as an alkylating agent in the alkylation step in accordance with the present invention.

The following table presents a comparison between the two methods of the present invention and the conventional polymerization reaction of the prior art in which alpha olefins alone are polymerized.

In the first run, pentene-1 was polymerized in isopentane as a diluent employing aluminum chloride as the catalyst. After 30 minutes reaction, hydrogen chloride was added to the reaction mixture and the polymerization catalyst was converted to an alkylation catalyst. The reaction proceeded for another 120 minutes and a product was separated, recovered, and its characteristics determined; these data are reported in the first column of the table.

In the second run, the data of which are presented in the second column of the table, pentene-1 was admixed with isopentene employing aluminum chloride as the catalyst to which hydrogen chloride was added during the whole period of polymerization-alkylation which covered 80 minutes. Similar to the first run, a product was obtained, the characteristics of which were determined and reported in the table.

The data in the third column of the table show conventional operation.

Table

| Run No. | 1 | 2 | 3 |
|---|---|---|---|
| Charge, parts: | | | |
| Pentene-1 | 200 | 194 | 194. |
| Isopentane | 194 | 188 | 188. |
| Catalyst, parts: | | | |
| $AlCl_3$ | 2 | 4 | 1. |
| HCl | 2 | 8 | None. |
| Method of Addition of HCl | Added during period of about 30 min. after polymerization was complete. | Added during entire polymerization reaction. | None added. |
| Reaction temp., °F | 85 | 90 | 85. |
| Reaction time, Min | 150 | 80 | 180. |
| Product, material boiling above 350° F. at 4 mm. mercury absolute: | | | |
| Yields, parts | 192 | 207 | 158. |
| Vis. 210° F., seconds S. U.[1] | 126 | 92 | 104. |
| Viscosity Index | 98 | 91 | 96. |
| Bromine Number | 8 | 8 | 23. |

[1] Saybolt Universal.

It will be apparent from the foregoing data that the two operations following the present invention produced substantially greater yields of polymers of substantially lower unsaturation than the product of the conventional operation. The reduction in the number of double bonds is reflected by the reduction of bromine number from 23 to 8 which indicates substantially complete saturation since some substitution reactions may occur in determining bromine numbers in the lower ranges reported. While the addition of the hydrogen chloride throughout the reaction period is less desirable than the addition of hydrogen chloride after the polymerization reaction has been substantially completed as reflected by a lower viscosity index, it is to be noted that the yield by this method is substantially greater than when the hydrogen chloride is added after the polymerization has been terminated or when the polymerization is conducted in the conventional manner. The temperature conditions found most suitable in the present invention in both the polymerization and alkylation reactions will ordinarily be atmospheric conditions of around 85° F. However, other temperatures in the range from about 70° F. up to about 250° F. may be employed. The lower temperatures, however, in the range given will be preferred especially when substantially pure alpha olefins comprise the feed stocks. When the feed stocks, i. e. the alpha olefins, are contaminated with oxygenated compounds or beta olefins, higher temperatures, in the range given, may be required.

It has been mentioned before that the naphthenes may be employed as a diluent and as the alkyating media. It is preferred to use the substituted naphthenes such as methyl cyclopentane, methyl cycloheptane, and the other substituted members of the naphthene hydrocarbon series.

The nature and objects of the present invention having been fully described and illustrated, what I wish to claim as new and useful and to secure by Letters Patent is:

1. A method for producing an improved lubricating oil which includes the steps of contacting an alpha olefin under conditions suitable for polymerization with substantially anhydrous Friedel-Crafts type catalyst in the presence of an isoparaffin diluent for the reaction to form a polymer in the lubricating oil boiling range, admixing hydrogen halide with the reaction mixture to terminate the polymerization reaction and to initiate the alkylation reaction, and alkylating the polymer with the isoparaffin to form a substantially saturated product suitable for use as a lubricating oil.

2. A method for producing an improved lubricating oil which includes the steps of contacting a low-boiling alpha olefin under substantially atmospheric conditions of temperature with substantially anhydrous aluminum halide in the presence of an isoparaffin to form a polymer in the lubricating oil boiling range, admixing hydrogen halide with the reaction mixture to convert the aluminum halide from a polymerization catalyst to an alkylation catalyst, and continuing the reaction under substantially atmospheric temperature conditions to alkylate the polymers with the isoparaffin to form a substantially saturated product suitable for use as a lubricating oil.

3. A method for producing an improved lubricating oil which includes the steps of contacting pentene-1 in the presence of a substantially equal amount of isopentane at a substantially atmospheric temperature with substantially anhydrous aluminum chloride for a time sufficient to form a polymer in the lubricating oil boiling range, terminating the polymerization reaction and initiating the alkylation of polymer by addition of hydrogen chloride to the reactants while maintaining substantially atmospheric temperature conditions, continuing the reaction at said temperature for a period of time sufficient to alkylate the polymer and recovering a product of a substantially saturated nature suitable for use as a lubricating oil.

RAYMOND L. HEINRICH.

REFERENCES CITED

The following references are of record in the file of this patent:

UNITED STATES PATENTS

| Number | Name | Date |
|---|---|---|
| 2,398,495 | D'Ouville et al. | Apr. 16, 1946 |